United States Patent [19]

Wilkinson

[11] Patent Number: 5,359,464
[45] Date of Patent: Oct. 25, 1994

[54] METHODS OF AND APPARATUS FOR CODING TELEVISION SIGNALS HAVING VARYING FRAME RATES

[75] Inventor: James H. Wilkinson, Basingstoke, United Kingdom

[73] Assignee: Sony Corporation, Tokyo, Japan

[21] Appl. No.: 51,576

[22] Filed: Apr. 22, 1993

Related U.S. Application Data

[63] Continuation of Ser. No. 643,353, Jan. 22, 1991, abandoned.

[30] Foreign Application Priority Data

Feb. 6, 1990 [GB] United Kingdom ............ 9002559.4

[51] Int. Cl.$^5$ ............................................. H04N 5/78
[52] U.S. Cl. ................................. 360/33.1; 360/19.1; 360/48; 358/343
[58] Field of Search ................ 358/343, 342, 341; 360/19.1, 33.1, 48, 32; 348/484

[56] References Cited

U.S. PATENT DOCUMENTS

| | | | |
|---|---|---|---|
| 4,348,699 | 9/1982 | Tsuchiya et al. | 360/32 |
| 4,602,295 | 7/1986 | Moriyama et al. | 358/343 |
| 4,660,103 | 4/1987 | Wilkinson et al. | 358/343 X |
| 4,757,393 | 7/1988 | Dakin et al. | 358/343 X |
| 4,819,088 | 4/1989 | Higurashi | 360/19.1 |
| 5,200,864 | 4/1993 | Dunn et al. | 360/48 |

FOREIGN PATENT DOCUMENTS

| | | |
|---|---|---|
| 0093374 | 11/1983 | European Pat. Off. |
| 0127033 | 12/1984 | European Pat. Off. |
| 0208931 | 1/1987 | European Pat. Off. |
| 0310330 | 4/1989 | European Pat. Off. |
| 0335273 | 10/1989 | European Pat. Off. |
| 2118802 | 11/1983 | United Kingdom . |

Primary Examiner—Andrew L. Sniezek
Attorney, Agent, or Firm—William S. Frommer; Alvin Sinderbrand

[57] ABSTRACT

Apparatus for coding a television signal in common image format in which the video frame rate may have any one of a plurality of predetermined different values and the number of pixels or the spatial resolution per video frame of which is the same for all frame rates, comprises a video encoder for coding the video information of each video frame into a format suitable for recording in oblique tracks on a magnetic tape, and an audio encoder for coding the audio information associated with each video frame into blocks for recording with the video information, each audio block comprising digital audio data and a pointer indicating that portion of the block containing the audio data, and preferably also the sample rate of the audio data.

15 Claims, 2 Drawing Sheets

METHODS OF AND APPARATUS FOR CODING TELEVISION SIGNALS HAVING VARYING FRAME RATES

This application is a continuation of application Ser. No. 07/643,353, filed Jan. 22, 1991, now abandoned.

BACKGROUND OF THE INVENTION

1. Field of the Invention

This invention relates to methods of and apparatus for coding television signals, and to apparatus for decoding television signals so coded.

2. Description of the Prior Art

A so-called common image format for high definition digital television is currently receiving attention. The concept envisages that for a variety of frame rates, such as 24 frames per second as used for film, and 25 and 29.97 frames per second as used for television in Europe, and the United States and Japan, respectively, the image size in terms of pixels in both the horizontal (number of samples) and vertical (number of lines) directions is constant. The concept is also applicable to a 30 frames per second television system. The number of pixels proposed is similar to that used for high definition digital television, and may be 1920 pixels horizontally and 1080 pixels vertically.

Suppose that common image format is to be used to make a film. In that case a common image format high definition digital television equipment is operated at 24 frames per second, and all operations, such as recording and editing, effected prior to transfer to film are carried out at 24 frames per second. The final edited version can then readily be transferred to film, as the frame rate is already correct.

Suppose now that common image format is to be used in Europe to make a television programme. In that case the common image format high definition digital television equipment is operated at 25 frames per second, and all operations, such as recording and editing, effected prior to broadcast transmission are carried out at 25 frames per second. The final edited version could of course then be transmitted as a high definition television signal, but until such a system comes into widespread use, conversion, for example to the 625-line system will be necessary prior to the transmission. However, it is to be noted that the necessary standards conversion can be quite simply effected because only spatial sub-sampling is required. No temporal interpolation is required, because the signal already has the required frame rate. The necessary standards converter is therefore relatively simple and cheap, and the quality of the final television signal is at least as good as that which would have been obtained if the whole process had been carried out using standard 625-line equipment.

Again, suppose that the same television programme is to be broadcast in Japan or the USA, where the frame rate is 29.97 per second. It should first be noted that a significant advantage of the common image format is that whatever the particular frame rate in use, the resulting signal can readily be recorded using a common helical-scan digital video tape recorder (VTR) in which the tape speed and the drum speed can selectively be controlled to correspond to the frame rate. In the present case, therefore, the television programme would have been recorded in Europe using such a VTR operating at a speed corresponding to 25 frames per second. The resulting tape could then be sent to Japan, for example, and reproduced using a similar VTR which, although normally operated at a speed corresponding to 29.97 frames per second would, for the purpose of reproducing this tape, be operated at a speed corresponding to 25 frames per second to reproduce the tape at the correct real time speed. The reproduced signal would then be standards converted to the 525-line 29.97 frames per second NTSC system used in Japan. This standards conversion involves changing the frame rate from 25 to 29.97 per second, and hence is preferably done using a relatively sophisticated motion-compensating standards converter. Such machines are expensive, but it is to be noted that with common image format, such a standards converter need only be used where there is conversion from high definition television to another television system having a different frame rate.

Common image format can also be applied to television systems in which the video signal is in analog form. In this case the band-width of the video signal is proportional to the frame rate, so that a bandwidth of 25 MHz may correspond to 25 frames per second, while a bandwidth of 30 MHz corresponds to 30 frames per second. When recording using a helical-scan analog VTR, a greater band-width and hence a higher frequency corresponds to a higher recording speed, and vice versa, but the spatial resolution per frame remains constant. In such a case it is envisaged that the audio signal will be in digital form, so references in this specification to an analog VTR mean a VTR which records video in analog form and audio in digital form.

Thus, it will be seen that common image format offers significant advantages in the production, processing, recording and standards conversion of video signals. In particular, common image format digital VTRs and analog VTRs can be provided which use a respective common track format and have the facility referred to above of operating with tape and drum speeds corresponding to various different frame rates. There is, however, a problem with a digitally recorded audio signal which, with the digital or analog video signal, forms the complete television signal. This problem is that for any given audio sample rate, such as 44.1 or 48 KHz, the number of audio samples associated with each video frame will vary depending on the frame rate.

SUMMARY OF THE INVENTION

One object of the present invention is to provide a method of coding a television signal including audio information.

Another object of the present invention is to provide a method of coding a television signal including coding audio information associated with each video frame into blocks each with a pointer indicating that portion of the block containing the audio data.

Another object of the present invention is to provide a method of coding a television signal including coding audio information associated with each video frame into blocks each with a pointer indicating that portion of the block containing the audio data and the sample rate of the audio data.

Another object of the present invention is to provide apparatus for coding a television signal including audio information associated with each video frame into blocks each with a pointer indicating that portion of the block containing the audio data.

Another object of the present invention is to provide apparatus for coding a television signal including audio information associated with each video frame into blocks each with a pointer indicating that portion of the block containing the audio data and the sample rate of the audio data.

According to the present invention there is provided a method of coding a television signal, the video frame rate of which is selected from a plurality of predetermined different values and in which the number of pixels per video frame in both the horizontal and vertical directions is the same for all said frame rates, comprising coding audio information associated with each video frame into a number of blocks each comprising digital audio data and a pointer indicating that portion of the block containing said audio data.

According to the present invention there is also provided an apparatus for coding a television signal, the video frame rate of which is selected from a plurality of predetermined different values, the apparatus comprising: means for coding the video information of each video frame for recording in an oblique track or tracks on a magnetic tape said coding having a common image format wherein the number of pixels per video frame in both the horizontal and vertical directions is the same for all frame rates; and means for coding audio information associated with each said video frame into a number of blocks for recording with said video information, each said audio block comprising digital audio data and a pointer indicating that portion of the block containing said audio data.

The above, and other objects, features and advantages of this invention will be apparent from the following detailed description of illustrative embodiments which is to be read in connection with the accompanying drawings.

DESCRIPTION OF THE PREFERRED EMBODIMENTS

The invention will be described as applied to the recording and reproduction of a digital television signal in common image format, with the number of pixels per frame constant at 1920 horizontally by 1080 vertically, but with a variable frame rate of 24, 25, 29.97 or 30 per second. However, it is to be noted that the above numbers are merely given as examples. The digitally coded television signal is to be recorded using a helical-scan digital VTR, which uses the same track format for all frame rates, and accommodates the different frame rates by variation of the tape and drum speeds. Thus while the format of individual oblique tracks will remain the same, the number of oblique tracks per second will vary with the frame rate. At 25 frames per second there may, for example, be 24×25 oblique tracks per second.

Figure 1:
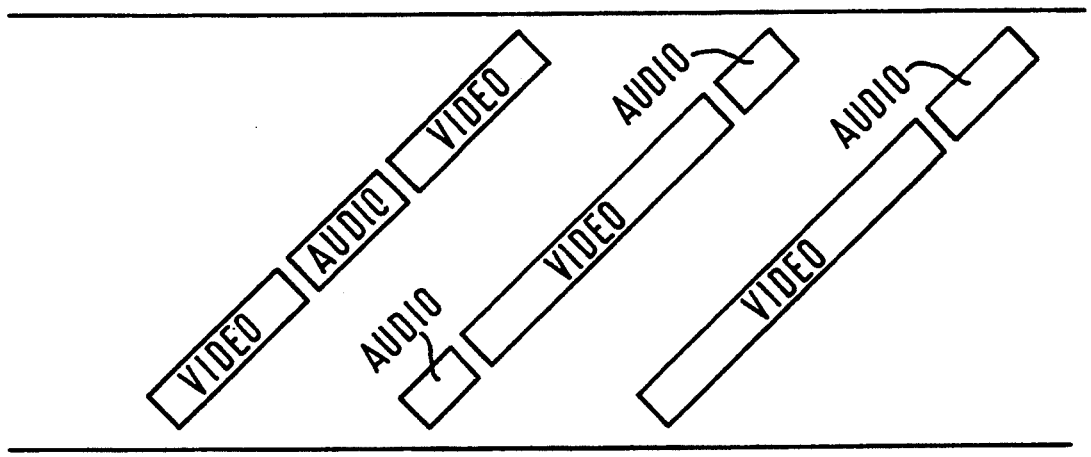
FIG. 1 shows diagrammatically various formats for recording a television signal in oblique tracks on a magnetic tape.

FIG. 1 shows three examples of possible track formats on a magnetic tape. In the left-hand oblique track the video data are recorded in two blocks at the beginning and end respectively of the track, with the audio data recorded in a block at the centre of the track. In the centre oblique track the video data are recorded in a single central block with the audio data in two blocks at the beginning and end respectively of the track. In the right-hand oblique track there is again only one audio data block, this being at the end of the track. The second and third examples may be used for recording television signals comprising analog video and digital audio using an analog VTR. This is referred to again below.

Suppose then that a digital television signal is recorded in common image format at 25 frames per second with 24 tracks per frame, and with the format of the left-hand oblique track of FIG. 1. Then there is one audio block per track, and each audio block contains 1/24 of the audio for a video frame. However, if the frame rate is changed then the above fraction changes. In other words, assuming a constant audio sample rate of say 44.1 or 48 KHz, the number of bytes of audio data in each audio block will change with changes in the frame rate. Similar considerations of course will apply if the audio is separated into two or more audio blocks per track.

In embodiments of the present invention, therefore, each audio block contains a pointer indicating the audio data, that is, the active portion of each audio block containing the audio data, and preferably also the audio sampling rate. The former indication may be given in any one of a variety of different ways. For example, the pointer may indicate the recording frame rate (from which the extent of the audio data can be determined), or may indicate the number of audio data bytes in the audio block, or may indicate the frame rate by specifying the window in the audio block in which the audio data bytes are contained. More generally, the pointer may be a byte which indicates a range of block lengths up to 256 options.

Figure 2:
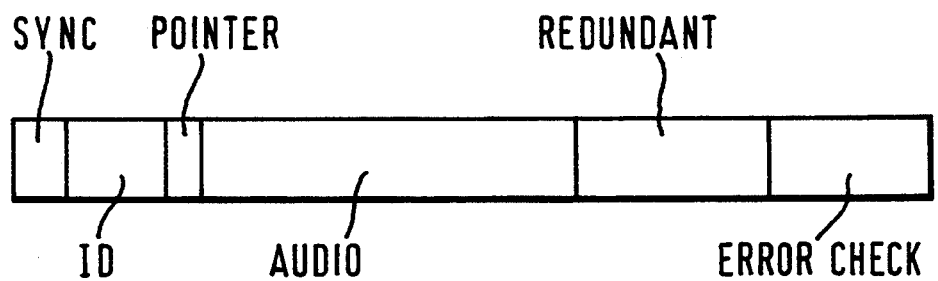
FIG. 2 shows diagrammatically an audio data block in such a format.

FIG. 2 shows an example of the format of an audio block which comprises a synchronizing signal, identification (TD) data of known form, the pointer which may be a single byte, the audio data, redundant data, and error check data of known form. The audio block is of constant length, independent of the frame rate. Hence the redundant data are necessary to fill any unused space in the portion of the audio block allocated to the audio data, although this portion may be such that there are no redundant data at the lowest frame rate to be used. The pointer may be incorporated into the synchronizing signal or the ID data, it merely being preferred that the pointer precedes the audio data, to facilitate decoding of the audio data. It will generally be sufficient for the pointer to be capable of assuming eight different values, corresponding to frame rates of 24, 25, 29.97 and 30 per second, and the two commonly used audio sample rates of 44.1 and 48 KHz.

Figure 3:
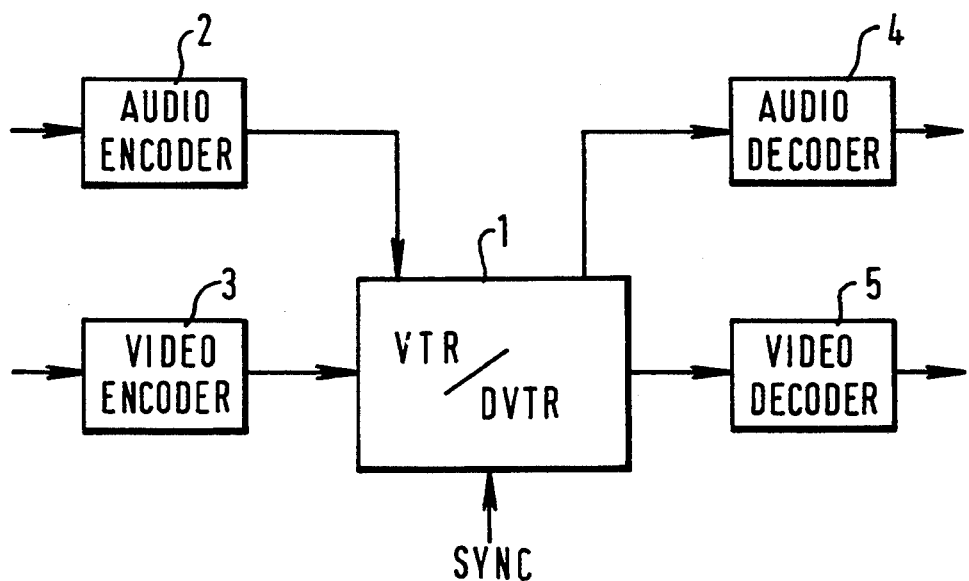
FIG. 3 shows in block form apparatus for recording a television signal.

FIG. 3 shows apparatus for recording a television signal in common image format and comprising a helical-scan digital VTR 1 as referred to above, to which is supplied a sync signal selectively corresponding to a frame rate of 24, 25, 29.97 or 30 per second to control the tape and drum speeds. The incoming television signal is assumed to be in separate audio and video paths which are connected to respective audio and video encoders 2 and 3. The signal in the audio path may of course comprise a plurality of audio channels. The audio encoder 2 may be of known form except that it additionally derives the pointer in dependence on the frame rate and the audio sample rate and incorporates the pointer in each audio block supplied to the digital VTR 1. The video encoder 3 may be of known form.

On reproduction from the digital VTR 1 the audio ant video data are demultiplexed into separate paths and supplied to respective audio and video decoders 4 and 5. The video decoder 5 may be of known form, but the audio decoder 4 has to be modified from the known form in order to incorporate means to extract and decode the pointer, and to extract and decode the audio data as indicated by the pointer.

Figure 4:
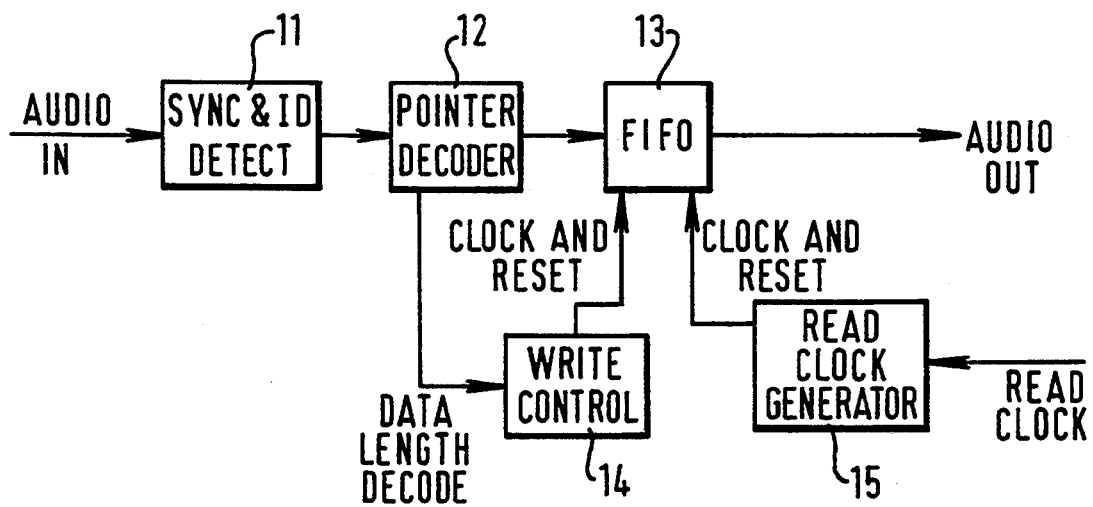
FIG. 4 shows in block form apparatus for decoding an audio signal.

FIG. 4 shows in more detail the parts of the audio decoder 4 of FIG. 3 which are concerned with these processes. These parts comprise a sync and ID detector 11, a pointer decoder 12, a first-in-first-out audio data memory 13, a write control 14 and a read clock generator 15.

The operation is as follows. The reproduced audio blocks are supplied to the detector 11 which identifies and frames the audio blocks in dependence on the synchronising signal, and extracts any required information from the ID signal. The pointer decoder 12 extracts and decodes the pointer to obtain an indication of the active portion of each audio block. This indication is supplied in the form of a control signal to the write control 14, whereby the memory 13 only writes the audio data contained in each audio block. Thus the control signal may indicate the start point and duration of the audio data, or the window in the audio block which contains the audio data. The read clock generator 15 operates under control of a read clock signal to supply a clock and reset signal to the memory 13 whereby the audio data are read out at the original sample rate for subsequent digital to analog (D/A) conversion. The audio decoder 4 of FIG. 3 also extracts the error check data from each audio block and applies error detection and correction to the audio data in known manner prior to the D/A conversion.

Thus the audio data can be correctly decoded despite changes in the video frame rate at which the television signal is produced and recorded.

Although described previously in relation to a digital television system, that is one in which the television signal comprises digital video and digital audio, the invention is also applicable to an analog television system in which the television signal comprises analog video and digital audio. As explained above, in the application of common image format to such an analog television system, the band-width of the analog video signal is proportional to the frame rate, and when recording using a helical-scan analog VTR, a greater band-width and hence a higher frequency corresponds to a higher recording speed, and vice versa, but the number of pixels per frame in both the horizontal and vertical directions remains constant.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of coding a television signal comprised of pixels of video information arranged in a sequence of video frames and audio information associated with said video frames, respectively, said television signal having a frame rate which is selected from a plurality of predetermined different values and said audio information having a sample rate selected from among a plurality of predetermined different values, the method comprising the steps of:
   coding the video information of each video frame into at least one video block for recording in at least one oblique track on a magnetic tape, said coding having a common image format wherein the number of pixels per video frame in both the horizontal and vertical directions is the same for all said values of the frame rate; and
   coding said audio information associated with each video frame into at least one audio block for recording on the oblique track containing the corresponding at least one video block, in which the video and audio blocks on each oblique track are alternately arranged along the respective track and in which each said audio block comprises a number of bytes of digital audio data and a pointer having data which indicates the selected frame rate, said number of bytes of digital audio data comprised in each audio block being determined on the basis of said selected frame rate.

2. A method according to claim 1 wherein the step of coding said audio information further comprises including in said pointer data indicative of the selected sample rate of said digital audio data.

3. A method according to claim 1 wherein the step of coding said audio information further comprises including in said pointer data indicative of the number of bytes of digital audio data in each said audio block.

4. A method according to claim 3 wherein the step of coding said audio information further comprises including in said pointer data indicative of the selected sample rate of said digital audio data.

5. A method according to claim 1 wherein the step of coding said audio information further comprises including in said pointer data indicative of a window in each said audio block containing said digital audio data.

6. A method according to claim 5 wherein the step of coding said audio information further comprises including in said pointer data indicative of the selected sample rate of said digital audio data.

7. A method according to claim 1 wherein the step of coding said audio information includes arranging each said audio block so that it comprises a constant length portion which contains said digital audio data plus redundant data to fill any remaining space in said portion.

8. Apparatus for coding a television signal comprised of pixels of video information arranged in a sequence of video frames and audio information associated with said video frames, respectively, said television signal having a frame rate which is selected from a plurality of predetermined different values and said audio information having a sample rate selected from among a plurality of predetermined different values, the apparatus comprising:
   means for coding the video information of each video frame into at least one video block for recording in at least one oblique track on a magnetic tape, said coding having a common image format wherein the number of pixels per video frame in both the horizontal and vertical directions is the same for all said values of the frame rate; and
   means for coding said audio information associated with each said video frame into at least one audio block for recording on the oblique track containing the corresponding at least one video block, in which the video and audio blocks on each oblique track are alternately arranged along the respective track and in which each said audio block comprises a number of bytes of digital audio data and a pointer having data which indicates the selected frame rate, said number of bytes of digital audio data comprised in each audio block being determined on the basis of said selected frame rate.

9. Apparatus according to claim 8 wherein said pointer further indicates data which indicates the selected sample rate of said digital audio data.

10. Apparatus according to claim 8, wherein said pointer further includes data which indicates the number of bytes of digital audio data in each said audio block.

11. Apparatus according to claim 10 wherein said pointer further includes data which indicates the selected sample rate of said digital audio data.

12. Apparatus according to claim 8 wherein said pointer further includes data which indicates a window in each said audio block containing said digital audio data.

13. Apparatus according to claim 12 wherein said pointer further includes data which indicates the selected sample rate of said digital audio data.

14. Apparatus for recording a television signal comprised of pixels of video information arranged in a sequence of video frames and audio information associated with said video frames, respectively, said television signal having a frame rate which is selected from a plurality of predetermined different values and said audio information having a sample rate selected from among a plurality of predetermined different values, the apparatus comprising:

a coding apparatus having means for coding the video information of each video frame into at least one video block for recording in at least one oblique track on a magnetic tape in a common image format wherein the number of pixels per video frame in both the horizontal and vertical directions is the same for all said values of the frame rate, and means for coding the audio information associated with each said video frame into at least one audio block for recording on the oblique track containing the corresponding at least one video block, in which the video and audio blocks on each oblique tracks are alternately arranged along the respective track and in which each said audio block comprises a number of bytes of digital audio data and a pointer having data which indicates the selected frame rate, said number of bytes of digital audio data comprised in each audio block being determined on the basis of said selected frame rate;

a helical-scan video tape recorder for recording said video and audio blocks in the at least one oblique track on said magnetic tape; and means for controlling tape speed and drum speed of said video tape recorder in dependence on said selected frame rate of said television signal.

15. Apparatus for recording and reproducing a television signal comprised of pixels of video information arranged in a sequence of video frames and audio information associated with said video frames, respectively, said television signal having a frame rate which is selected from a plurality of predetermined different values and said audio information having a sample rate selected from among a plurality of predetermined different values, the apparatus comprising:

a coding apparatus having means for coding the video information of each video frame into at least one video block for recording in at least one oblique track on a magnetic tape in a common image format wherein the number of pixels per video frame in both the horizontal and vertical directions is the same for all said values of the frame rate, and means for coding the audio information associated with each said video frame into at least one audio block for recording on the oblique track containing the corresponding at least one video block, in which the video and audio blocks on each oblique track are alternately arranged along the respective track and in which each said audio block comprises a number of bytes of digital audio data and a pointer having data which indicates the selected frame rate, said number of bytes of digital audio data comprised in each audio block being determined on the basis of said selected frame rate;

a helical scan video tape recorder-reproducer for recording said video and audio blocks and reproducing said video and audio blocks from, the at least one oblique track on said magnetic tape;

means for controlling tape speed and drum speed of said video tape recorder reproducer in dependence on said selected frame rate of said television signal;

a memory to which said at least one audio block reproduced from said magnetic tape is supplied; and means for controlling writing of the digital audio data comprised in said at least one audio block in said memory and reading said digital audio data from said memory in dependence on said pointer.

* * * * *